United States Patent
Fuchs

[19]

[11] Patent Number: 6,059,440

[45] Date of Patent: May 9, 2000

[54] TWIN-SCREW EXTRUDER

[75] Inventor: Erwin Fuchs, Altmünster, Austria

[73] Assignee: Weingärtner Maschinenbau Gesellschaft m.b.H., Kirchham, Australia

[21] Appl. No.: 09/145,907

[22] Filed: Sep. 2, 1998

[30] Foreign Application Priority Data

Sep. 3, 1997 [AT] Austria ................................ 1473/97

[51] Int. Cl.$^7$ ....................................................... B29B 7/46
[52] U.S. Cl. .................................................. 366/83; 366/88
[58] Field of Search .......................... 366/79, 81, 83–85, 366/88, 90, 318, 319, 321, 322, 323; 425/204, 208, 209

[56] References Cited

U.S. PATENT DOCUMENTS

| | | | |
|---|---|---|---|
| 3,667,733 | 6/1972 | Fritsch | 366/85 |
| 3,687,423 | 8/1972 | Koch et al. | 366/81 |
| 4,140,400 | 2/1979 | Lovegrove | 366/81 |
| 4,474,474 | 10/1984 | Blach | 366/85 |

FOREIGN PATENT DOCUMENTS

| | | | |
|---|---|---|---|
| 807186 | 6/1951 | Germany | 366/85 |
| 935 634 | 11/1955 | Germany . | |
| 2 364 507 | 6/1974 | Germany . | |

*Primary Examiner*—Charles E. Cooley
*Attorney, Agent, or Firm*—Collard & Roe, P.C.

[57] ABSTRACT

A multi-screw extruder consists of contra-rotating screws (20) inserted in a housing, whose flights (1) form intermeshing crests (2) and roots (3), and which have at least two axial sections (21, 22, 23) of flights each differing in number and pitch. To improve the manufacturing conditions, and to achieve uniform wear conditions over the screw length, adjacent axial sections (21, 22, 23) of a screw (20) verge into each other within an axial transition zone (24) free from annular grooves, where all roots (3) extend through the transition zone (24) while making turns ($\alpha$) and forming ramifications or combinations (V), and at least one of the crests (2) begins or ends in the transition zone (24).

2 Claims, 2 Drawing Sheets

(PRIOR ART) FIG.1
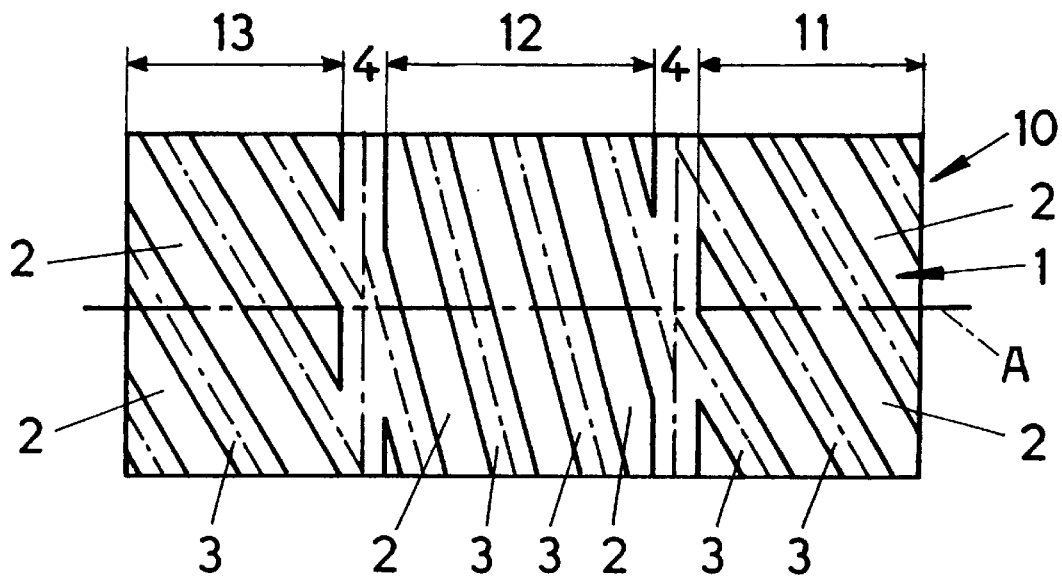
FIG.2
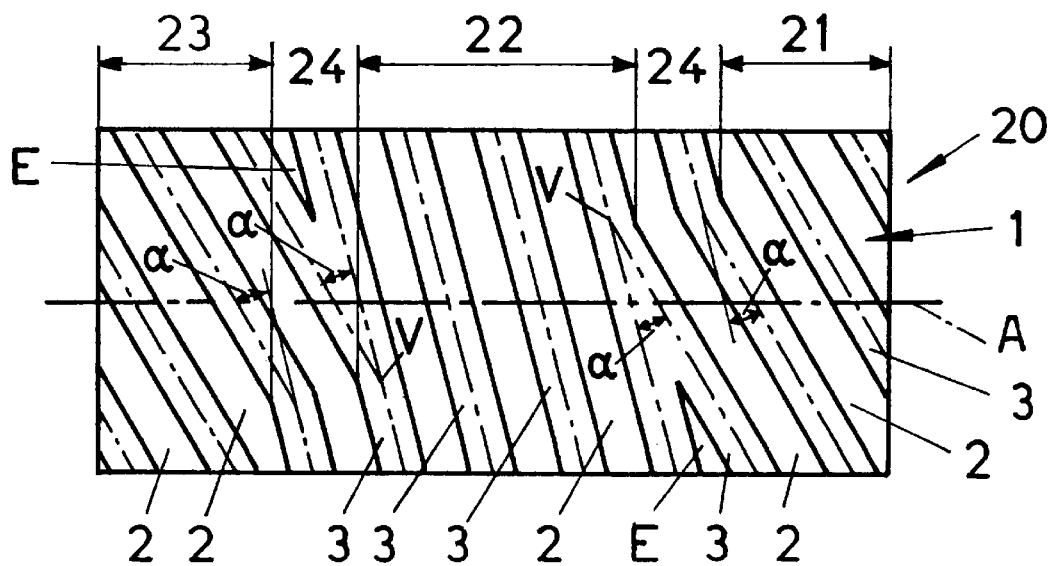

TWIN-SCREW EXTRUDER

BACKGROUND OF THE INVENTION

1. Field of the Invention

This invention relates to a multi-screw extruder, in particular a twin-screw extruder, comprising/counter-rotating screws inserted in a housing, whose flights form intermeshing crests and roots, and which have at least two axial sections of flights each differing in number and pitch.

2. Description of the Prior Art

Such extruders comprise two or more cylindrical or conical screws arranged one beside the other in an adapted housing, which screws are counter-rotatingly meshing with each other, so that geometrically sealed chambers are formed, which are moved in axial direction during the screw rotation, and a forced conveyance of the medium filling the chambers is achieved. In the plastics industry, such multi-screw extruders are used as plastics processing machines due to the possibility of a forced movement of the medium under the influence of pressure, so as to pressurize the plastic material, knead, melt, mix, homogenize or also degas the same and convey the same to the outlet, for which purpose screws with a varying number of flights and/or pitch may be used in dependence on the effects to be achieved. Accordingly, the screws form axial sections of flights differing in number and/or pitch, where up to now the axial sections whose transitions also involve changes in pitch and in the number of flights are completely separated from each other by annular grooves, which are formed by recesses in axially normal planes. These annular grooves should ensure that an unimpeded flow is maintained and the plastic material moving along the roots is not blocked due to a change in the number of flights effected by an occurring crest. Taking into account the usual manufacturing tolerances, the annular groove also facilitates the proper engagement of the crests and roots in the transition zone of the axial sections. However, the annular grooves lead to an undesired wear of the housing, as in the vicinity of the annular grooves the housing wall is subjected to wear in contrast to the remaining screw portions, and after a certain operating period protruding annular webs are left at the housing wall, which impede or even exclude above all the use of different types of screw in the existing housing. Moreover, the annular grooves are often disturbing for manufacturing the flights of adjacent axial sections by means of face milling cutters dimensioned larger than the width of the recess, and enforce the processing of the flight sections opening into the annular grooves by means of special face milling cutters having a smaller diameter. The same is true for manufacturing these flights by peripheral milling, peripheral grinding or whirling. To reduce the wear of the housing in the vicinity of the annular grooves, it has already been proposed to dispose the annular grooves in a plane inclined with respect to the screw axis, but such constructions could not gain acceptance due to the major manufacturing difficulties involved.

As is disclosed in DE 23 64 507 A, a change in the number of flights without annular grooves is known per se for single screws with a second root, so-called barrier screws, but these do not constitute two true flights, but only a second root, where the first root is sealed at the outlet end and the second root is sealed at the inlet end, so that the material conveyed must necessarily flow over the existing barrier from the first into the second root, in order to be molten under the occurring shear forces. There is no forced conveyance, but because of the single screw arrangement, which is necessary as a result of the rolling conditions, only a friction-related conveying effect.

SUMMARY OF THE INVENTION

It is therefore the object underlying the invention to create a multi-screw extruder as described above, which provides for utilizing the advantages of counter-rotating screws with a different number of flights and a different pitch, while eliminating the disadvantages resulting from the annular grooves between the axial sections.

This object is solved by the invention in that adjacent axial sections of a screw verge into each other in a manner known per se within an axial transition zone free from annular grooves, where all roots extend through the transition zone while making turns and forming ramifications or combinations, and at least one of the crests begins or ends in the transition zone. The through-type thread roots ensure an unimpeded flow of plastic material along the flights, where the turns take into account the changes in pitch, and the number of flights can be increased or reduced by the ramifications or combinations. From among the crests at least one should be interrupted due to the through-type roots, but the crests may all be interrupted as well, which improves the homogenizing effect. The interruption of the crests leads to a beginning or an end of a crest, where this beginning or end each preferably has a plan form triangular in a development corresponding to the ramifications or combinations of the roots. The overlapping transition between the axial sections leads to a uniform wear load of the associated housing without the risk of an occurrence of annular webs, the engagement of roots and crests is perfectly effected in the transition zone even in consideration of usual manufacturing tolerances, and last but not least the transitions free from annular grooves, which transitions have relatively small turns of the flights as compared to the annular grooves, provide more favorable manufacturing conditions which facilitate in particular the use of whirl tools.

BRIEF DESCRIPTION OF THE DRAWING

In the drawing, the subject-matter of the invention is illustrated purely schematically, wherein FIG. 1 represents a screw for a known multi-screw extruder in a lateral development, and FIGS. 2, 3 and 4 represent various embodiments of screws of inventive multi-screw extruders, each likewise shown in a lateral development.

DETAILED DESCRIPTION OF THE PREFERRED EMBODIMENTS

Figure 3:
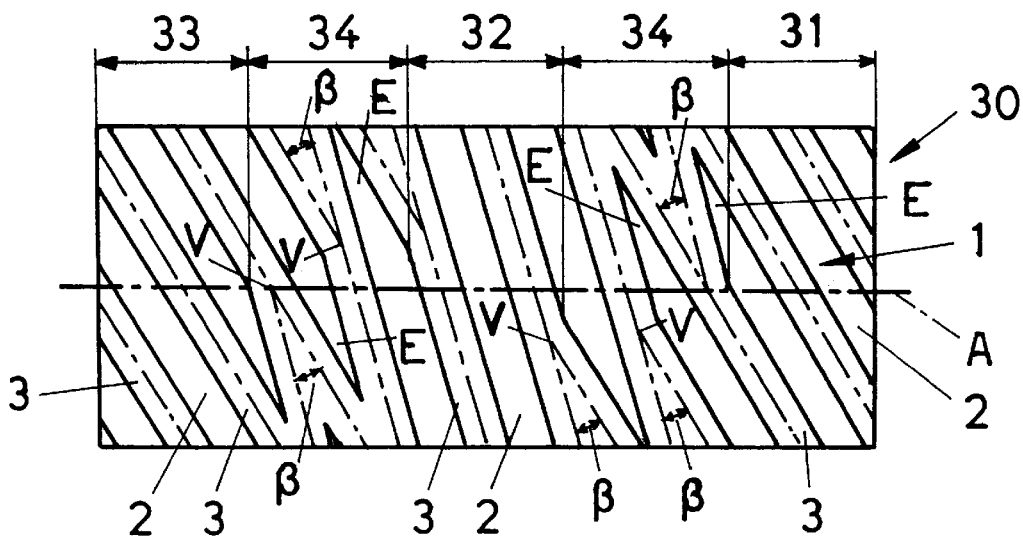

As is indicated in FIG. 1, a known type of screw 10 for multi-screw extruders comprises axial sections 11, 12, 13 arranged one behind the other along the screw axis A, whose flights 1 forming crests 2 and roots 3 differ in number and pitch, where the individual axial sections 11, 12, 13 are each separated from each other by axially normal annular grooves 4.

To avoid such separation of the axial sections by annular grooves, the adjacent axial sections 21, 22, 23, 31, 32, 33, 41, 42, 43 of the inventive screws 20, 30, 40 verge into each other within an axial transition zone 24, 34, 44, where all roots 3 extend through the transition zone corresponding to the changes in pitch while forming turns α, β, γ and ramifications or combinations V for changing the number of flights, and at least one of the crests 2 is interrupted and ends or begins with a triangular end E.

In accordance with the embodiment shown in FIG. 2, the axial sections 21, 22, 23 have a change in the number of flights from 2 to 1 to 2, and the pitch changes from a larger value to a smaller one and then again to a larger one, where in each of the transition zones 24 one of the crests ends or begins and one of the crests is of the through type like all roots.

In accordance with the embodiment shown in FIG. 3, all crests are interrupted merely in the transition zones and only the roots are of the through type, while the rest is the same.

Figure 4:
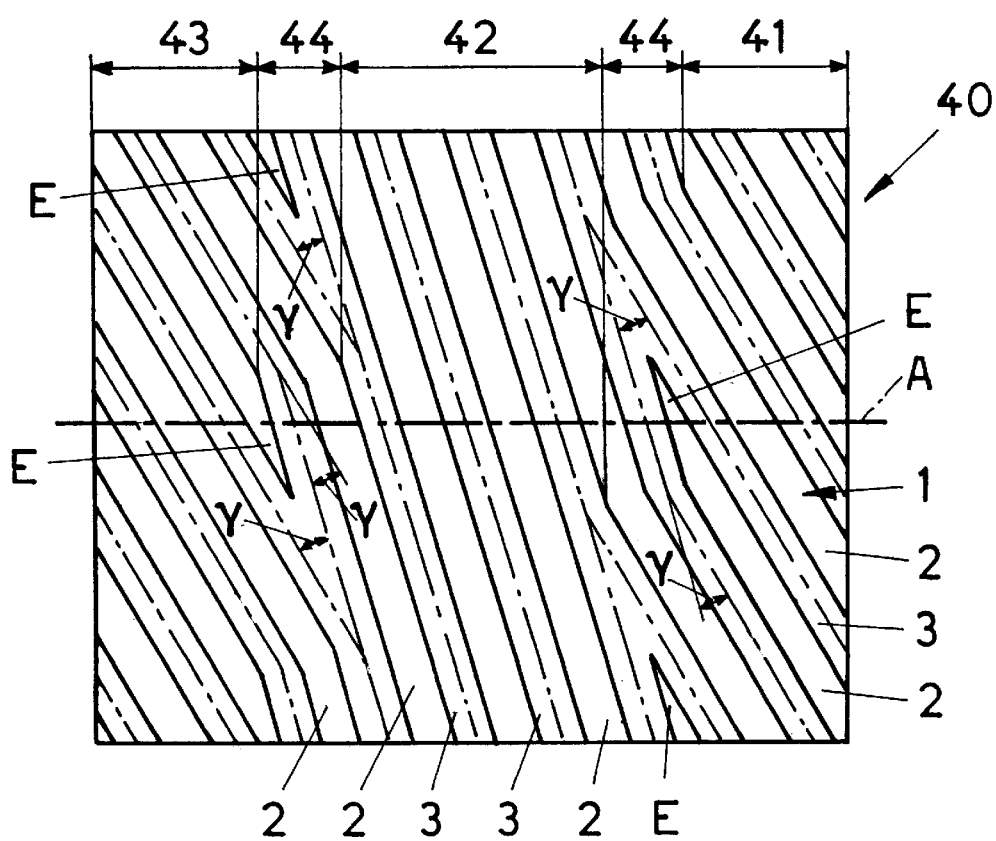

In accordance with the embodiment shown in FIG. 4, the number of flights changes from 4 to 2 to 4, and beside the through-type roots two crests are each interrupted and end or begin again.

What is claimed is:

1. A multi-screw extruder comprising counter-rotating screws each having an axis and flights forming meshing crests and roots, the screws each having at least two axial sections having flights differing in number and pitch, and wherein adjacent ones of the axial sections verge into each other in a transition zone free of an annular groove extending perpendicularly to the axis, the roots forming portions of a changed pitch in the transition zone, and at least one of said crests has an end in the transition zone.

2. The multi-screw extruder of claim 1, wherein at least one of the portions of a changed pitch branches off a respective one of the roots.

* * * * *